United States Patent
Coles et al.

(10) Patent No.: US 12,470,651 B1
(45) Date of Patent: *Nov. 11, 2025

(54) CONTEXTUAL MOBILE CLIENT APPLICATION SYSTEMS AND METHODS

(71) Applicant: Wells Fargo Bank, N.A., San Francisco, CA (US)

(72) Inventors: Nathan Coles, El Cerrito, CA (US); Darren Goetz, Salinas, CA (US); Uma Meyyappan, Freemont, CA (US); Dennis Montenegro, Concord, CA (US); Steve Perez, Alameda, CA (US); Debarchana Roy, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 561 days.

This patent is subject to a terminal disclaimer.

(21) Appl. No.: 17/873,005

(22) Filed: Jul. 25, 2022

Related U.S. Application Data

(63) Continuation of application No. 16/934,785, filed on Jul. 21, 2020, now Pat. No. 11,399,091.

(51) Int. Cl.
| | |
|---|---|
| *H04W 24/00* | (2009.01) |
| *G06F 9/445* | (2018.01) |
| *G06N 5/04* | (2023.01) |
| *G06Q 10/0631* | (2023.01) |
| *G06Q 10/10* | (2023.01) |
| *G06Q 10/105* | (2023.01) |
| *G06Q 20/08* | (2012.01) |

(Continued)

(52) U.S. Cl.
CPC ...... *H04M 1/72454* (2021.01); *G06F 9/4451* (2013.01); *G06N 5/04* (2013.01); *G06Q 10/063114* (2013.01); *G06Q 10/103* (2013.01); *G06Q 10/105* (2013.01); *G06Q 20/0855* (2013.01); *G06Q 20/108* (2013.01); *G06Q 20/3223* (2013.01); *G06Q 20/3224* (2013.01); *G06Q 20/326* (2020.05); *G06Q 20/40145* (2013.01); *G06Q 30/0185* (2013.01); *G06Q 30/0201* (2013.01); *G06Q 40/02* (2013.01); *G06Q 50/01* (2013.01); *H04M 1/72457* (2021.01); *H04W 4/021* (2013.01)

(58) Field of Classification Search
CPC .......... H04M 1/72454; H04M 1/72457; G06F 9/4451; G06N 5/04; G06Q 10/063114; G06Q 10/103; G06Q 10/105; G06Q 20/0855; G06Q 20/108; G06Q 20/3223; G06Q 20/3224; G06Q 20/326; G06Q 20/40145; G06Q 30/0185; G06Q 30/0201; G06Q 40/02; G06Q 50/01; H04W 4/021
USPC .............................. 455/456.1–456.3; 370/338
See application file for complete search history.

(56) References Cited

U.S. PATENT DOCUMENTS

| | | |
|---|---|---|
| 6,349,290 B1 | 2/2002 | Horowitz et al. |
| 7,882,058 B1 | 2/2011 | Ghaed |

(Continued)

*Primary Examiner* — Marcos Batista
(74) *Attorney, Agent, or Firm* — Foley & Lardner LLP

(57) ABSTRACT

A method includes obtaining, by a mobile client application of a user mobile device, context data associated with a user, predicting, by the mobile client application, an intended action of the user to be performed at a provider location based on the context data associated with the user, and switching, by the mobile client application, into a context-based application mode based on the intended action of the user.

20 Claims, 4 Drawing Sheets

(51) Int. Cl.
*G06Q 20/10* (2012.01)
*G06Q 20/32* (2012.01)
*G06Q 20/40* (2012.01)
*G06Q 30/018* (2023.01)
*G06Q 30/0201* (2023.01)
*G06Q 40/02* (2023.01)
*G06Q 50/00* (2012.01)
*H04M 1/72454* (2021.01)
*H04M 1/72457* (2021.01)
*H04W 4/021* (2018.01)

(56) References Cited

U.S. PATENT DOCUMENTS

| | | |
|---|---|---|
| 7,890,425 B2 | 2/2011 | Stanley |
| 8,843,939 B2 | 9/2014 | Lesandro et al. |
| 9,923,412 B2 | 3/2018 | Macinnes et al. |
| 10,051,415 B1 | 8/2018 | Lalka et al. |
| 10,181,154 B1 | 1/2019 | Budde et al. |
| 10,223,680 B2 | 3/2019 | Pigg et al. |
| 10,276,170 B2 | 4/2019 | Gruber et al. |
| 10,475,446 B2 | 11/2019 | Gruber et al. |
| 2006/0288110 A1 | 12/2006 | Alden et al. |
| 2012/0233066 A1 | 9/2012 | Vallabhaneni |
| 2014/0249977 A1 | 9/2014 | Kuznetsov et al. |
| 2015/0130811 A1 | 5/2015 | Ellis et al. |
| 2015/0134675 A1 | 5/2015 | Ellis et al. |
| 2015/0178835 A1 | 6/2015 | Quillian |
| 2016/0180316 A1* | 6/2016 | Wang ................. G06Q 20/223 705/39 |
| 2018/0033010 A1 | 2/2018 | Ustinov et al. |
| 2018/0114207 A1 | 4/2018 | Budde et al. |

* cited by examiner

CONTEXTUAL MOBILE CLIENT APPLICATION SYSTEMS AND METHODS

CROSS-REFERENCE TO RELATED APPLICATIONS

This application is a continuation of U.S. patent application Ser. No. 16/934,785, filed on Jul. 21, 2020, which is incorporated herein by reference in its entirety and for all purposes.

TECHNICAL FIELD

Embodiments of the present disclosure relate generally to a mobile client application. In particular, they relate to systems and methods for a context-based application configured to switch between various modes based on user information.

BACKGROUND

Traditionally, mobile client applications associated with providers have been limited in their capacity to adapt to different scenarios. Specifically, mobile client applications have generally provided users with various predetermined functionalities based on offered services and/or products associated with the provider. However, because various functionalities provided by mobile client applications may only be used by certain users in specific scenarios, mobile client applications have generally been over-inclusive in their functionalities (e.g., resulting in a cluttered and confusing user interface) or under-inclusive in their functionalities (e.g., resulting in users being unable to perform various desired functions for given scenarios).

SUMMARY

A first embodiment relates to a method. This method includes determining, by a mobile client application, that a user mobile device associated with a user is physically located within or near a provider location associated with a provider. The method includes switching, by the mobile client application, into a contextual provider location mode associated with the provider location. The method further includes obtaining, by the mobile client application, user information associated with the user, the user information comprising context data associated with the user. The method further includes predicting, by the mobile client application, an intended action of the user to be performed at the provider location based on the context data associated with the user. The method further includes switching, by the mobile client application, into a context-based application mode based on the user information and the intended action of the user.

Another embodiment relates to a mobile banking application system associated with a provider. The system comprising a provider computing system associated with the provider. The system further comprising a user mobile device including a network interface circuit and a processing circuit, the network interface circuit being configured to communicate with the provider computing system over a network, the processing circuit including a processor and a memory, the memory containing instructions executable by the processor. The executed instructions cause it to determine, that a user mobile device associated with a user is physically located within or near a provider location associated with the provider. The executed instructions further cause it to switch into a contextual provider location mode associated with the provider location. The executed instructions further cause it to obtain user information associated with the user, the user information comprising context data associated with the user. The executed instructions further cause it to predict an intended action of the user to be performed at the provider location based on the context data associated with the user. The executed instructions further cause it to switch into a context-based application mode based on the user information and the intended action of the user.

Another embodiment relates to a non-transitory computer-readable media having computer-executable instructions embodied therein that, when executed on a processor of a user mobile device, cause the user mobile device to perform operations, the operations comprising, determine that the user mobile device associated with a user is physically located within or near a provider location associated with a provider. The operations further comprising, switch into a contextual provider location mode associated with the provider location. The operations further comprising, obtain user information associated with the user, the user information comprising context data associated with the user. The operations further comprising predict an intended action of the user to be performed at the provider location based on the context data associated with the user. The operations further comprising switch into a context-based application mode based on the user information and the intended action of the user.

These and other features, together with the organization and manner of operation thereof, will become apparent from the following detailed description when taken in conjunction with the accompanying drawings.

DETAILED DESCRIPTION

Referring generally to the figures, systems and methods for providing a mobile client application which utilizes contextual data to modify its behavior and appearance are shown and described. Hereinafter, this modification of behavior and appearance is referred to as the mobile client application switching between a variety of context-based modes. These context-based modes may allow for the user to be provided with a variety of appropriate functionalities for a given scenario (or context). For example, the systems and methods herein allow for various user information (e.g., contextual data, transactional data, historical data, emotional data, demographic data) and user-related data (e.g., current events that may affect the user) to actively predict the users intended action and provide real-time functionality to the user to improve their experience. Furthermore, the mobile client application is configured to provide real-time suggestions to the user as to how they may improve their experience while performing their intended action. For example, the mobile client application may provide a suggestion to the user indicating that they may more efficiently perform their intended action by utilizing a self-service device (e.g., an ATM) to complete an intended deposit. Similarly, the mobile client application may provide a suggestion to the user requesting them to provide various information while they wait for an available teller, thereby allowing for their interaction with the teller to run more efficiently.

Accordingly, the systems and methods provided herein improve upon prior systems and methods by providing context-specific functionality and information to the user of the mobile client application, thereby providing a personalized experience for the user, which automatically takes into account a multitude of contextual variables to determine the best manner in which to serve the user. Furthermore, the context-based modes may include various collaboration modes that allow for various users (e.g., customers, provider employees, service people) to collaboratively interact using their respective devices. For example, this type of collaboration may allow for various users to exchange information and permissions back and forth using their respective devices to allow for improved efficiency while performing various actions associated with the provider. Furthermore, the mobile client application may be configured to determine, based on contextual information about the user, whether a given action is being performed appropriately. In some instances, this may allow for various traditional dual-custody activities to be performed by provider employees without direct supervision from a second party (e.g., a manager).

Figure 1:
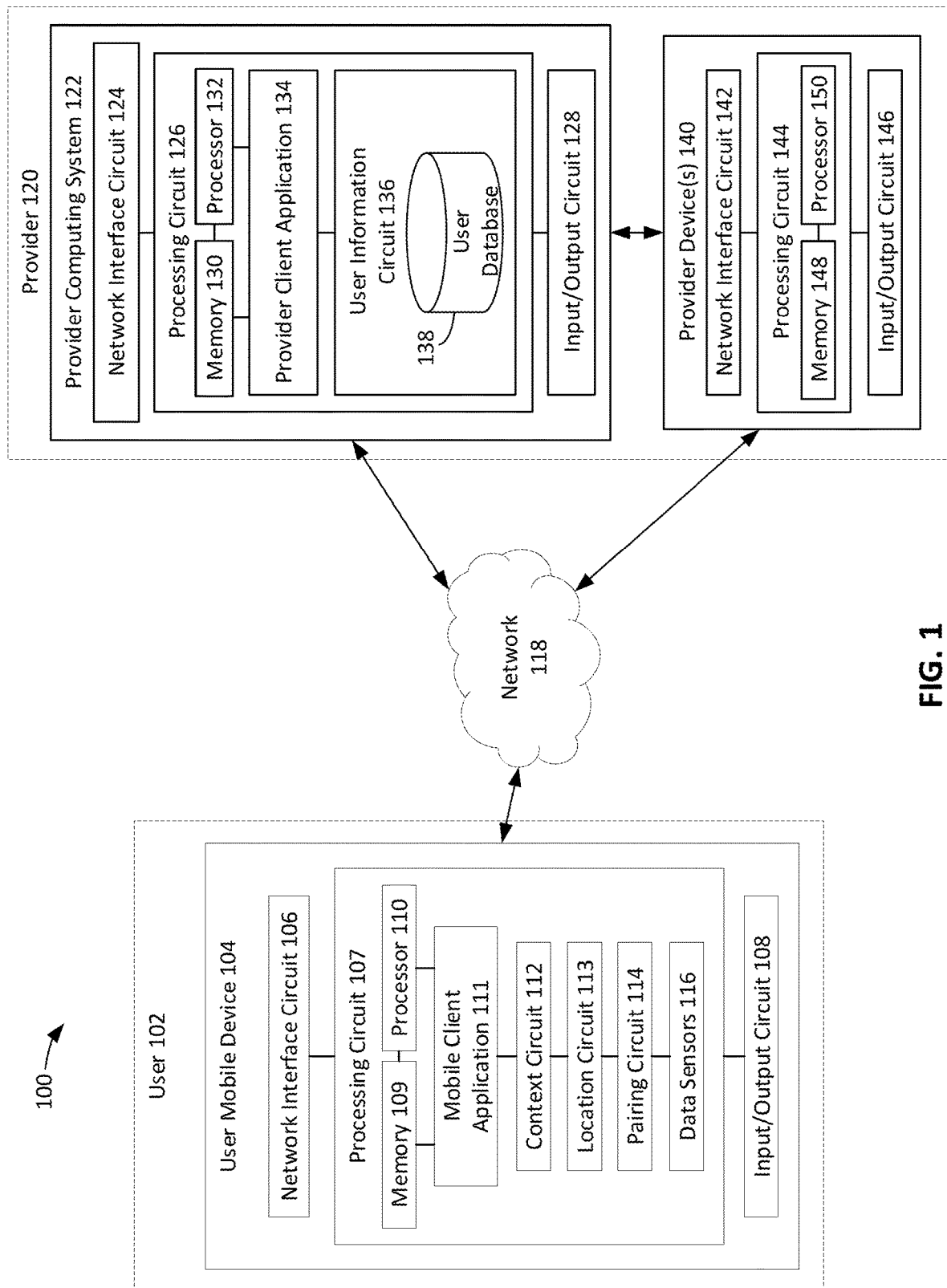
FIG. 1 is a schematic diagram of a context-based mobile application system, according to an example embodiment.

Referring to FIG. 1, a schematic design of a context-based mobile application system 100, is shown according to an example embodiment. The context-based mobile application system 100 includes a user mobile device 104, a provider computing system 122, and one or more provider devices 140 associated with the provider computing system 122. The user mobile device 104, the provider computing system 122, and the one or more provider devices 140 are each communicably coupled and configured to exchange information over a network 118, which may include one or more of the Internet, cellular network, Wi-Fi, Wi-Max, a proprietary banking network, a proprietary retail or service provider network, or any other type of wired or wireless network.

The user mobile device 104 may be any of a variety of devices associated with a user 102. For example, the user mobile device 104 may comprise a mobile phone, a personal computer (e.g., a desktop computer or a laptop computer), a tablet, a smart watch or other wearable device, a smart vehicle voice/touch command system (e.g., within a vehicle of the user 102), a virtual/augmented reality (VR/AR) system, and/or any other suitable user computing devices capable of accessing and communicating using local and/or global networks (e.g., the network 118). As will be described herein, the user 102 may be a customer, an account holder, a provider employee, a service person associated with the provider 120, or any other entity who has registered to use the mobile client application 111.

The user mobile device 104 comprises a network interface circuit 106, a processing circuit 107, and an input/output circuit 108. The network interface circuit 106 is used to establish connections with other computing systems and user mobile devices (e.g., the provider computing system 122 and the one or more provider devices 140) by way of the network 118. Accordingly, the network interface circuit 106 enables the user mobile device 104 to transmit and/or receive information to and/or from the provider computing system 122 and the one or more provider devices 140. The network interface circuit 106 includes program logic that facilitates connection of the user mobile device 104 to the network 118. For example, the network interface circuit 106 may include any combination of a wireless network transceiver (e.g., a cellular modem, a Bluetooth transceiver, a WiFi transceiver, etc.) and/or a wired network transceiver (e.g., an Ethernet transceiver). In some arrangements, the network interface circuit 106 includes the hardware and machine-readable media sufficient to support communication over multiple channels of data communication. Further, in some arrangements, the network interface circuit 106 includes cryptography capabilities to establish a secure or relatively secure communication session in which data communicated over the session is encrypted.

The processing circuit 107 includes a memory 109, a processor 110, a mobile client application 111, a context circuit 112, a location circuit 113, a pairing circuit 114, and data sensors 116. The memory 109 may be one or more devices (e.g., RAM, ROM, Flash memory, hard disk storage) for storing data and/or computer code for completing and/or facilitating the various processes described herein. Memory 109 may be or include non-transient volatile memory, non-volatile memory, and non-transitory computer storage media. Memory 109 may include database components, object code components, script components, or any other type of information structure for supporting the various activities and information structures described herein. The memory 109 may be communicably coupled to the processor 110 and include computer code or instructions for executing one or more processes described herein. The processor 110 may be implemented as one or more application specific integrated circuits (ASICs), field programmable gate arrays (FPGAs), a group of processing components, or other suitable electronic processing components. As such, the user mobile device 104 is configured to run a variety of application programs and store associated data in a database of the memory 109. One such application may be the provider 120 mobile client application 111.

In some embodiments, the mobile client application 111 may be incorporated with an existing application in use by the user mobile device 104 (e.g., a mobile banking application, a service provider application, etc.). In other embodiments, the mobile client application 111 is a separate software application implemented on the user mobile device 104. For example, the mobile client application 111 may be downloaded by the user mobile device 104 prior to its usage, hard coded into the memory 109 of the user mobile device 104, or be a network-based or web-based interface application such that the provider computing system 122 may provide a web browser to access the application, which may be executed remotely from the user mobile device 104. In some instances, the mobile client application 111 may be developed and maintained (e.g., provided with software updates on a regular or semi-regular basis) by the provider 120 using the provider computing system 122. Accordingly, the user mobile device 104 may include software and/or hardware capable of implementing a network-based or web-based application. For example, in some instances, the mobile client application 111 includes software such as HTML, XML, WML, SGML, PHP (Hypertext Preprocessor), CGI, and like languages.

In the latter instance, the user (e.g., the user 102) may have to log onto or access the web-based interface before usage of the application. Further, and in this regard, the mobile client application 111 may be supported by a separate computing system (e.g., the provider computing system 122)

including one or more servers, processors, network interface circuits, etc. that transmit applications for use to the user mobile device 104.

Furthermore, prior to use of the mobile client application 111 and/or at various points throughout the use of the mobile client application 111, the user (e.g., the user 102) may be required to provide various authentication information (e.g., a password, a pass code, a fingerprint scan, a retinal scan, a voice sample, a face scan, any other type of biometric security scan) to ensure that the user 102 associated with the user mobile device 104 is, in fact, the user using the user mobile device 104.

In certain embodiments, the mobile client application 111 includes an application programming interface (API) and/or a software development kit (SDK) that facilitate the integration of other applications with the mobile client application 111. For example, in some embodiments, the mobile client application 111 is configured to utilize the functionality of various service provider computing systems (e.g., the provider computing system 122) by interacting with various applications developed and/or maintained by the service provider computing systems through an API.

The mobile client application 111 is structured to provide displays to the user mobile device 104 to provide a context-based interface to a user (e.g., the user 102) based on a variety of user information (e.g., employer-related data, contextual data, location data, historical data, demographic data, and/or any other relevant data) pertaining to the user. The context-based interface may be used by the user to perform a variety of functions that may be specifically tailored to the user based upon the user information, a location of the user, and/or corresponding services associated with the location of the user.

The mobile client application 111 is configured to receive the user information from a variety of sources. For example, in some instances, the mobile client application 111 may receive user information from the provider computing system 122 and/or the one or more provider devices 140. In some instances, the mobile client application 111 may additionally receive user information from various systems and/or devices associated with services providers who have opted in for interaction with the mobile client application 111 (e.g., via the network 118 or via the data sensors 116).

In any case, based on the received user information, the mobile client application 111 is configured to determine (e.g., via the context circuit 112, the location circuit 113, the pairing circuit 114, and/or the data sensors 116) a user context and a user location. The mobile client application 111 may further be configured to switch into any of a variety of context-based modes based on the user context and user location. For example, in some instances, the mobile client application 111 may typically be run in a normal mode. The normal mode may provide a user interface allowing the user to view and/or access various functionalities (e.g., account access, fund transfers) associated with and/or offered by the provider 120 or any other providers who have registered for interaction with the mobile client application 111. The mobile client application 111 may then be configured to switch into a variety of context-based application modes, such as, for example, a contextual provider location mode, a drive through or drive up window mode, a cooperation mode, a delegate mode, an employee mode, a service mode, a corporate mode, and/or a variety of other context-based modes based on the user information described herein.

The mobile client application 111 is configured to utilize the context circuit 112 to analyze the user information received by the mobile client application 111 to determine the user's context. In some instances, the context circuit 112 is further configured to predict an intended action of the user 102 based on the user context, the user location, and historical data pertaining to the user. In some instances, the context circuit 112 is further configured to preemptively provide suggestions to the user based on the user context, the user location, and the intended action to allow for the user to more effectively and/or efficiently complete the intended action, as will be described further below.

In some instances, the context circuit 112 is configured to incorporate artificial intelligence (AI) models to study user behavior over time and/or historical data pertaining to the user's behavior (or the behavior of similar users). That is, the AI models can be trained to identify the intended action based on the user information by studying user behavior over time and/or historical data pertaining to the user's behavior (or the behavior of similar users) to predict an intended action of the user. The context circuit 112 may further be configured to continuously monitor the user's behavior to continuously learn and refine the predicting of the user's intended actions. The context circuit 112 may similarly be configured to confirm that the user 102 associated with the user mobile device 104 is the user operating the user mobile device 104 by noticing differences in the user's behavior versus the historical behavior data pertaining to the user 102.

Additionally, the context circuit 112 is configured to utilize the AI models to preemptively provide the suggestions to the user based on the user context, the user location, and the predicted intended action by studying historical data pertaining to suggestions provided to users in similar contexts, locations, and/or who were performing actions similar to the predicted intended action. Similarly, the context circuit 112 may further be configured to monitor the user's receptiveness and/or responses to provided suggestions over time to continuously learn and refine the suggestions provided to the user.

The mobile client application 111 is configured to utilize the location circuit 113 to determine the user location and/or the user's movement based on the received user information. In some instances, the location circuit 113 may receive various location data and/or movement data from the data sensors 116. For example, the data sensors 116 may comprise global position system (GPS) sensors, proximity sensors (e.g., near-field communication (NFC) sensors), accelerometers, and/or any other suitable data sensors configured to provide insight regarding a location and/or movement of the user (e.g., geographical location, speed, direction, acceleration, proximity to another device or system). Accordingly, the various location and/or movement data captured by the data sensors 116 may be utilized by the location circuit 113 to determine the user location and/or the user's movements in real time.

In some instances, the data sensors 116 may be configured to detect various systems and/or devices (e.g., the provider computing system 122 and/or the one or more provider devices 140) as the user brings the user mobile device 104 into close enough proximity with the various systems and/or devices. For example, as the user 102 enters a provider location (e.g., a branch) associated with a service provider (e.g., the provider 120), the user mobile device 104 may enter a geofence set up and associated with the service provider. Upon entering the geofence, the data sensors 116 may detect that the user mobile device 104 has entered the geofence, and the location circuit 113 may use this detection information to determine that the user mobile device 104 has entered (e.g., is within or near) the geofence associated with the service provider.

It will be appreciated that the mobile client application 111 may utilize the context circuit 112 and/or the location circuit 113, collectively or independently to determine a plurality of conclusions about the location and/or context of the user 102. For example, the mobile client application 111 may be configured to utilize the context circuit 112 and/or the location circuit 113 to determine that the user 102 has walked into a branch, driven up to a drive up lane, approached an ATM, and/or performed any other relevant actions with respect to the provider 120 (or any other providers who have opted in) that may be used to trigger the mobile client application 111 to switch to a different context-based application mode (e.g., a drive through or drive up mode).

Furthermore, the mobile client application 111 may utilize the pairing circuit 114 to enable the user mobile device 104 to pair with interactive electronics (e.g., the one or more provider devices 140) at a service provider location (e.g., a branch location associated with the provider 120). For example, the location circuit 113 may determine that the user 102 has approached an ATM and, through deductions of the context circuit 112, trigger the pairing circuit 114 to automatically pair the user mobile device 104 with the ATM. The pairing circuit 114 may be configured to pair the user mobile device 104 with the ATM or any other interactive electronics (e.g., the one or more provider devices 140) using a variety of technologies (e.g., Bluetooth, WiFi, QR code, biometrics, etc.). In some instances, upon pairing the user mobile device 104 with an interactive electronic device, the context circuit 112 may be configured to automatically trigger the mobile client application 111 to switch into an appropriate context-based mode based on the interactive electronic device that the user mobile device 104 has been paired to. For example, in the preceding ATM example, upon pairing with the ATM, the mobile client application 111 may be configured to provide a graphical user interface representing ATM controls (e.g., interactive options for withdrawing currency, depositing currency, checking account balances). Accordingly, in some instances the mobile client application 111 may facilitate the provider 120 to utilize headless ATMs (e.g., ATMs that do not have a built-in user interface). In some instances, prior to allowing any transactions or other interactions to be performed, the mobile client application 111 may be configured to confirm that the user mobile device 104 has been paired with the appropriate interactive electronic device. For example, if there are several ATMs, each may be labeled with a number, and the mobile client application 111 may request the user to confirm that they are at a particular ATM (e.g., ATM number 3).

The input/output circuit 108 is structured to receive communications from and provide communications to the user 102. In this regard, the input/output circuit 108 is structured to exchange data, communications, instructions, etc. with an input/output component of the user mobile device 104. In one embodiment, the input/output circuit 108 includes an input/output device. In another embodiment, the input/output circuit 108 includes communication circuitry for facilitating the exchange of data, values, messages, and the like between an input/output device and the components of the user mobile device 104. In yet another embodiment, the input/output circuit 108 includes machine-readable media for facilitating the exchange of information between an input/output device and the components of the user mobile device 104. In still another embodiment, the input/output circuit 108 includes any combination of hardware components, communication circuitry, and machine-readable media.

For example, in some embodiments, the input/output circuit 108 comprises suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or manipulation purposes. That is, the input/output circuit 108 provides an interface for the user 102 to interact with various applications (e.g., the mobile client application 111) stored on the user mobile device 104.

Still referring to FIG. 1, the provider computing system 122 is associated with (e.g., owned, managed, and/or operated by) the provider 120. The provider 120 may be, for example, a financial institution (e.g., a credit card issuer, a bank), a retailer, a service provider, or the like. The provider computing system 122 may similarly be any of a variety of devices associated with the provider 120. For example, the provider computing system 122 may comprise a mobile phone, a personal computer (e.g., a desktop computer or a laptop computer), a tablet, a smart watch or other wearable device, a virtual/augmented reality (VR/AR system), and/or any other suitable user computing devices capable of accessing and communicating using local and/or global networks (e.g., the network 118). The provider computing system 122 includes a network interface circuit 124, a processing circuit 126, and an input/output circuit 128.

The network interface circuit 124 is similarly structured and used to establish connections with other computing systems (e.g., the user mobile device 104, the provider devices 140) by way of the network 118. The network interface circuit 124 may further include any or all of the components discussed above, with reference to the network interface circuit 106 of the user mobile device 104.

The processing circuit 126 similarly includes a memory 130 and a processor 132. The memory 130 and the processor 132 are substantially similar to the memory 109 and the processor 110 described above. As such, the provider computing system 122 is similarly configured to run a variety of application programs and store associated data in a database of the memory 130. One such application may be a provider client application 134.

The provider client application 134 may be structured to provide displays to the provider computing system 122 to allow for a provider employee associated with the provider 120 to create, modify, and/or update a variety of modes to be presented to various users (e.g., the user 102) via corresponding user devices (e.g., the user mobile device 104) based on the users' context. The provider client application 134 may be further structured allow for the provider employee to select, identify, assign, and/or otherwise associate a variety of devices (e.g., provider devices 140) and/or locations with particular modes and/or functionalities to be presented and/or offered to the various users via the corresponding user devices.

The processing circuit 126 further includes a user information circuit 136 configured to retrievably store a variety of user information pertaining to various registered users (e.g., the user 102) who have registered to use and/or downloaded the mobile client application 111. In some instances, the user information circuit 136 includes a user database 138, which is configured to hold, store, categorize, and/or otherwise serve as a repository for user information associated with a plurality of registered users. For example, the user database 138 may be configured to retrievably store account data (e.g., whether the user is an account holder at the provider 120, account numbers, account balances, transaction history information), employer-related data (e.g., an indication of where the user works, an indication of whether the user works for the provider 120, an indication of whether the user works for a service provider associated with or otherwise utilized by the provider 120), social media data, demographic data, contextual data, locational data, behavioral data, permissions data (e.g., permissions associated with the user to access various accounts and/or functionalities associated with the provider 120 and/or any other registered provider), and/or any other relevant data or information pertaining to each of registered users. Accordingly, the user information circuit 136 is configured to selectively access the user database 138 to retrieve user information pertaining to a particular registered user (e.g., the user 102) and to provide the user information to the mobile client application 111 to be used to determine and appropriate application mode to provide to the registered user (e.g., the user 102) via their person device (e.g., the user mobile device 104).

It should be appreciated that the processing circuit 126 of the provider computing system 122 may additionally or alternatively include any of the various circuits described above, with respect to the user mobile device 104, such that the provider computing system 122 may be configured to perform any and/or all of the various functions described herein, with respect to the user mobile device 104. For example, in some instances, the processing circuit 126 of the provider computing system 122 may additionally or alternatively include a context circuit, a location circuit, and/or a pairing circuit similar in structure and functionality to the context circuit 112, the location circuit 113, and the pairing circuit 114 of the user mobile device 104 described above. Accordingly, in some instances, the provider computing system 122 may be configured to perform some or all of the various functionalities and methods of the user mobile device 104 described herein.

The input/output circuit 128 of the provider computing system 122 may function substantially similarly to and include the same or similar components as the input/output circuit 108 described above, with reference to the user mobile device 104. Accordingly, it will be understood that the description of the input/output circuit 108 provided above may also be applied to the input/output circuit 128 of the provider computing system 122. For example, the input/output circuit 128 is similarly structured to receive communications from and provide communications to various provider employees associated with the provider computing system 122.

Still referring to FIG. 1, the one or more provider devices 140 are similarly associated with the provider 120. The provider devices 140 may similarly be any of a variety of devices associated with the provider 120 and/or provider employees associated with the provider 120 (e.g., personal devices of the provider employees. For example, the provider devices 140 may comprise mobile phones, personal computers (e.g., desktop computers or laptop computers), tablets, smart watches or other wearable devices, virtual/augmented reality (VR/AR) systems and/or any other suitable user computing devices capable of accessing and communicating using local and/or global networks (e.g., the network 118). For clarity purposes, the following description will be in reference to a single provider device 140. However, it should be understood that any number of provider devices 140 may be utilized within the context-based mobile application system 100. Accordingly, the following description may be applied to each provider device 140 utilized within the context-based mobile application system 100.

The provider device 140 similarly includes a network interface circuit 142, a processing circuit 144, and an input/output circuit 146. The network interface circuit 142 is similarly structured and used to establish connections with other computing systems (e.g., the user mobile device 104, the provider computing system 122) by way of the network 118. The network interface circuit 142 may further include any or all of the components discussed above, with reference to the network interface circuit 106 of the user mobile device 104.

The processing circuit 144 similarly includes a memory 148 and a processor 150. The memory 148 and the processor 150 are substantially similar to the memory 109 and the processor 110 described above. As such, the provider device 140 is similarly configured to run a variety of application programs and store associated data in a database of the memory 148. In some instances, if the provider device 140 is a personal device of a provider employee, the processing circuit 144 may similarly include a mobile client application, similar to the mobile client application 111 described above, with respect to the user mobile device 104. However, as will be described herein, when the mobile client application 111 is utilized by the provider device 140, it may be tailored specifically to the provider employee associated with the provider device 140

Accordingly, it should be appreciated that the processing circuit 144 of the provider device 140 may similarly include any of the various circuits described above, with respect to the user mobile device 104, such that the provider device 140 may be configured to perform any and/or all of the various functions described herein, with respect to the user mobile device 104. For example, in some instances, the processing circuit 144 of the provider device 140 may additionally or alternatively include a context circuit, a location circuit, and/or a pairing circuit similar in structure and functionality to the context circuit 112, the location circuit 113, and the pairing circuit 114 of the user mobile device 104 described above. Accordingly, in some instances, the provider device 140 may be configured to perform some or all of the various functionalities and methods of the user mobile device 104 described herein.

The input/output circuit 146 of the provider device 140 may function substantially similarly to and include the same or similar components as the input/output circuit 108 described above, with reference to the user mobile device 104. Accordingly, it will be understood that the description of the input/output circuit 108 provided above may also be applied to the input/output circuit 146 of the provider device 140. For example, the input/output circuit 146 is similarly structured to receive communications from and provide communications to the provider employee associated with the provider device 140.

Figure 2:
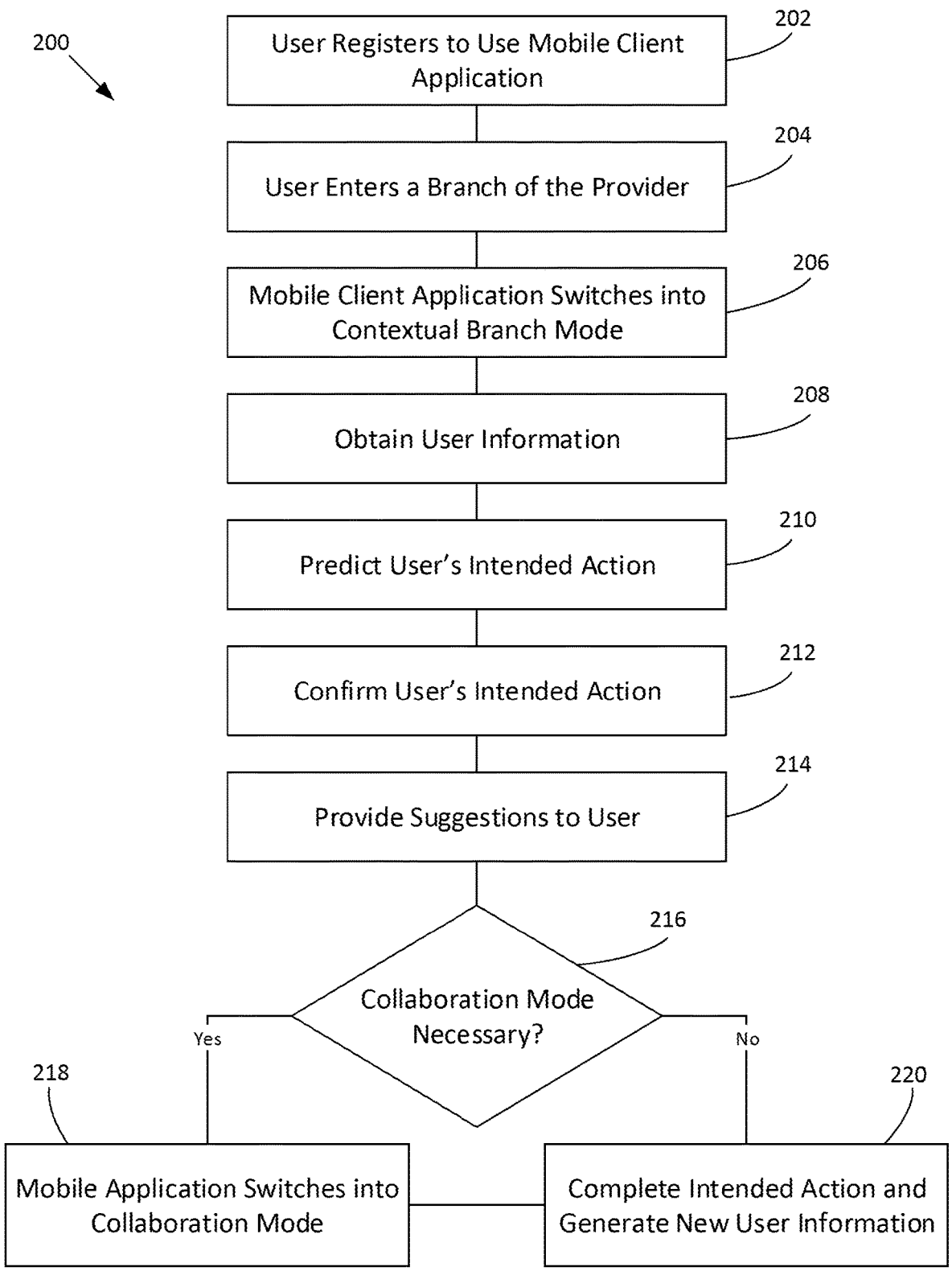
FIG. 2 is a flow diagram of a method for using a mobile client application by a user, according to an example embodiment.

Referring to FIG. 2, a flow diagram for a method 200 for using the mobile client application 111 by the user 102 is shown according to an example embodiment. In some instances, the user 102 may be a customer, a provider employee, a service person, or any other person who has registered for use of the mobile client application 111. The method 200 begins at with the user 102 opting in, downloading, or otherwise registering to use the mobile client application 111, at step 202. For example, in some instances, the provider 120 may require that the user 102 grant permission to the provider 120 to track user information associated with the user 102 and use the user information to provide various functionalities associated with the mobile client application 111. In some instances, once the user 102 has opted into the mobile client application 111, at step 202, the provider computing system 122 may be configured to transmit the mobile client application 111 to the user mobile device 104. In some other instances, the mobile client application 111 may be an internet-based application that is accessible by the user mobile device 104 via the network 118 (e.g., the internet).

Once the user 102 has registered to use the mobile client application 111, at step 202, the provider computing system 122 and/or the user mobile device 104 may determine that the user has entered a provider location (e.g., a branch) associated with the provider 120 (or any other service provider who have opted in for interaction with the mobile client application 111), at step 204. For example, in some instances, the provider computing system 122 and/or the user mobile device 104 may determine that the user has entered the provider location using geofencing technology. The geofencing technology may be implemented using, for example, GPS, RFID, Wi-Fi, cellular data, etc. In other instances, the provider computing system 122 and/or the user mobile device 104 may determine that the user has entered the provider location via a close-range network connection (e.g., near-field communication) technology. In yet other instances, the provider computing system 122 and/or the user mobile device 104 may use a variety of other suitable technologies to determine that the user has entered the provider location, such as, for example, video detection (e.g., using facial recognition), audio detection (e.g., voice recognition), proximity beacons, and/or any other suitable technology.

Subsequent to the user 102 entering the provider location, at step 204 the mobile client application 111 is configured to switch into a contextual provider location mode, at step 206. To switch into the contextual provider location mode, the mobile client application 111 is configured to modify its appearance, operation, and/or functionality in order to provide the user 102 with a tailored application experience specific to the provider location of the provider 120. For example, the contextual provider location mode may facilitate the user 102 to make a deposit, withdraw funds, access a safe deposit box, request assistance from a provider employee, or any other task which is able to be completed at the provider location.

Once the mobile client application 111 has switched into the contextual provider location mode, at step 206, the mobile client application 111 is configured to obtain user information pertaining to the user 102, at step 208. For example, the mobile client application 111 may be configured to request and receive the user information from the provider computing system 122 (e.g., stored within the user database 138). As alluded to above, the user information may comprise various contextual data pertaining to the user 102, such as, for example, location data (e.g., proximity to interactive electronics associated with the provider, proximity to provider employees of the provider 120), historical data (e.g., transaction history, behavioral history, actions taken by the user 102 in the past), demographic data (e.g., age, political affiliation, income level, credit score), behavioral data (e.g., user-specific movement data, typing speed), emotional data (e.g., live-sentiment information pertaining to the user 102), social media data, weather data, information regarding current events, and/or any other relevant information pertaining to the user 102 or that may affect the user 102. In some instances, the contextual provider location mode (or any of the other modes described herein) may be updated and/or modified based on the emotional data of the user. For example, if the context circuit 112 determines that the user is sad or angry (e.g., via captured video and/or voice data), the mobile client application 111 may alter the color of the user interface to colors known to induce counteractive emotions.

Once the mobile client application 111 has obtained the user information, at step 208, the mobile client application 111 may then analyze the user information to predict an intended action of the user 102, at step 210. For example, in some instances, the mobile client application 111 may utilize the context circuit 112 to analyze the user information. Accordingly, based on the analysis performed by the context circuit 112, the context circuit 112 is configured to predict the intended action for which the customer has entered the provider location to accomplish. For example, in some instances, the context circuit 112 may use historical data pertaining to the user to predict the intended action (e.g., the user has frequently come into a provider location to deposit a check on the first of the month). In some other instances, if the user 102 is newly-associated with the provider 120, the context circuit 112 may utilize demographic data associated with the user 102 to predict the intended action based on the intended actions of similar users in similar contexts.

For example, the intended action may be for the user 102 to complete a deposit with a teller working at the provider location. Alternatively, the user 102 may be intending to make a withdrawal from an ATM. In another example, the user 102 may be intending to contact a provider location employee in order to apply for a mortgage loan. In another example, the user 102 may be intending to access a safe deposit box.

After predicting the user's intended action, at step 210, the mobile client application 111 is configured to provide a request to the user to confirm the user's intended action, at step 212. For example, the mobile client application 111 is configured to provide a prompt to the user 102 (e.g., to the user mobile device 104), welcoming the user 102 to the provider location and asking whether the user 102 has entered the provider location to perform the predicted intended action. The user 102 may then either provide an indication that the predicted intended action is, in fact, why they have entered the provider location or provide an updated intended action.

Accordingly, upon confirming the user's intended action, at step 212, the mobile client application 111 is then configured to provide various suggestions for improving an experience of the user 102 while performing the intended action, at step 214. For example, the mobile client may similarly utilize the context circuit 112 to determine the various suggestions based on the user context, the user location, and the intended action. The various suggestions determined by the context circuit 112 may be provided to the user 102 to allow the user 102 to more easily and/or efficiently complete the intended action.

For example, in some instances, the suggestions may be to perform the intended action via a self-service device (e.g., making a deposit at an ATM as opposed to at a teller). In other instances, the suggestions may be requests to provide various information and/or view informational graphics or videos associated with the user's intended action ahead of a meeting with a teller (e.g., while waiting in line). In some instances, the suggestions may further include a brief description of why the suggestion is being provided. For example, the suggestion may indicate that a self-service option may save them time while making a deposit or that providing necessary information ahead of time will make an interaction with a teller go faster.

Once the mobile client application 111 has confirmed the user's intended action and has provided the various suggestions to the user 102, at steps 212 and 214, the mobile client application 111 may then determine whether a collaboration mode is necessary, at step 216. For example, in some instances, based on the intended action, the mobile client application 111 may determine that the user 102 needs the assistance of a provider employee. In some other instances, the collaboration mode may be based on proximity to interactive electronics at the provider location or proximity to provider employees of the provider location who are also running the mobile client application 111 (e.g., via a corresponding provider devices 140).

If the mobile client application 111 determines that the collaboration mode is necessary, at step 216, the mobile client application 111 is configured to switch into the collaboration mode, at step 218. To switch into the collaboration mode, the mobile client application 111 is configured to modify its appearance, operation, and/or functionality in order to provide the user 102 with a tailored application experience configured to allow the user 102 to effectively collaborate with the interactive electronics and/or a provider employee (e.g., via the corresponding provider device 140) to complete the intended action. Accordingly, in some instances, the collaboration mode may be a type of assisted service mode (e.g., when interacting with the provider employee) or a type of self-service mode (e.g., when interacting with an interactive electronic like an ATM).

In some instances, when switching into collaboration mode, the mobile client application 111 is configured to utilize the pairing circuit 114 in order to pair with the appropriate device (e.g., an ATM, the mobile client application 111 of an employee of the provider 120 provider location, etc.), thus facilitating collaborative interaction between the user mobile device 104 and the appropriate device to aid in the completion of user's intended action.

For example, instances that may necessitate collaboration mode may include interacting with a provider location employee, such as a provider location bank teller during a cash deposit. Another instance may include the user 102 accessing a resource which requires a provider location employee, such as a safe deposit box. Another instance may include the user 102 interacting with a headless ATM or any other interactive electronic at the provider location.

Once the mobile client application 111 has switched into collaboration mode, at step 218, or if the mobile client application 111 determines that collaboration mode is not necessary, at step 216, the user 102 may complete the intended action, and the mobile client application 111 may generate new user information, based on the user's actions while completing the intended action, at step 220. For example, based on the completed action, the mobile client application 111 may be configured to record and/or generate new user information based on various tasks performed by the user 102 while completing the intended action at the provider 120. Upon completion of the intended action by the user 102, the user may then exit the provider location, and the mobile client application 111 may be configured to exit the collaboration mode or the contextual provider location mode and return to a normal mode of the mobile client application 111. Upon completion of the intended action, the mobile client application 111 may be further configured to transmit the new user information back to the provider computing system 122 to be stored within the user database 138.

The following description provides various example embodiments of the method 200. It will be appreciated that the following embodiments are provided as examples and are in no way meant to be limiting. It will further be appreciated that the method 200 may be adapted, as necessary, to conform to a variety of potential functionalities corresponding to a variety of service providers offering differing services.

In one example embodiment of the method 200, the user 102, who has registered to use the mobile client application 111 and has granted permission to the provider 120 of the mobile client application 111 to use user information pertaining to the user 102, enters a provider location of the provider 120. Upon entering the provider location, geofencing technology is recognized by the location circuit 113 of the user mobile device 104, and the mobile client application 111 automatically switches into the contextual provider location mode.

Upon switching into the contextual provider location mode, the context circuit 112 of the mobile client application 111 may then request and receive user information pertaining to the user 102 and identify that the user 102 often goes to the provider location they have entered to deposit money. The mobile client application 111 may then provide a prompt to the user 102 (e.g., via the user mobile device 104) asking whether or not the customer has come to deposit money by interacting with a teller.

Upon receiving confirmation that the user has indeed come to deposit money, the context circuit 112 may further determine that the user 102 has traditionally made their deposits by interacting with a teller, that the provider location the user 102 has entered has an ATM configured for self-service deposits, and that making deposits at the ATM will allow the user 102 to complete their deposit more easily and efficiently than by making their deposit by interacting with the teller. Based upon this determination by the context circuit 112, the mobile client application 111 may then provide a suggestion to the user 102 suggesting that the user 102 instead make their deposit through self-service at the ATM.

If the user 102 agrees to use the ATM, the user 102 may then approach the ATM, and the ATM may be recognized by the location circuit 133 using proximity sensors (e.g., the data sensors 116). Upon recognizing the ATM, the pairing circuit 114 may be configured to automatically pair the user mobile device 104 with the ATM and switch into the collaborative mode. Within the collaborative mode, the mobile client application 111 may be configured to provide the user 102 with a user interface configured to allow the user 102 to control the ATM via their user mobile device 104. For example, the user interface provided by the mobile client application 111 may provide various ATM control options that would traditionally be provided on the ATM itself. Accordingly, the user 102 may complete their deposit at the ATM via interaction with the user interface provided by the mobile client application 111. Further, because the mobile client application 111 is configured to provide the user interface including the ATM control options that would otherwise need to be provided on the ATM itself, the mobile client application 111 may allow for a headless ATM (e.g., an ATM that does not include a traditional user interface) to be utilized by the provider 120.

In some instances, once the user 102 has completed their deposit at the ATM and walks away from the ATM, the location circuit 113 may be configured to sense that the user mobile device 104 is no longer in proximity to the ATM, the pairing circuit 114 may be configured to unpair from the ATM, and the mobile client application 111 may be configured to automatically return to the contextual provider location mode. Then, once the user 102 leaves the provider location, the location circuit 113 is configured to sense the user mobile device 104 exiting the provider location via the geofencing technology of the provider location and trigger the mobile client application 111 to exit the contextual provider location mode and return to the normal mode of the mobile client application 111.

In another example embodiment of the method 200, the user 102 who has registered to use the mobile client application 111 and granted permission to the provider 120 provider of the mobile client application 111 to use user information pertaining to the user 102, drives up to a drive up lane of a provider location of the provider 120 to complete an intended transaction. Upon entering the drive up lane, geofencing technology is similarly recognized by the location circuit 113 of the user mobile device 104, and the mobile client application 111 automatically switches into the contextual provider location mode (e.g., a drive through or drive up mode similar or identical to the contextual provider location mode discussed herein). Recognizing that the user 102 is in a drive up lane, the context circuit 112 may trigger the pairing circuit 114 to transfer display and controls to a smart vehicle voice/touch command system of the user 102, thereby facilitating a more convenient transaction experience for the user 102. As the user 102 completes the intended transaction and drives off, the geofencing technology of the provider location may similarly trigger the location circuit 113 to cause the mobile client application 111 to exit the contextual provider location mode and return to the normal mode of the mobile client application 111.

In another example embodiment of the method 200, the user 102, who has registered to use the mobile client application 111 and granted permission to the provider 120 provider of the mobile client application 111 to use user information pertaining to the user 102, enters a provider location of the provider 120 to complete an intended action. Geofencing technology of the provider location is similarly recognized by the location circuit 113 of the user mobile device 104 and the mobile client application 111 automatically switches into the contextual provider location mode.

The user 102 may then approach and begin interacting with an employee of the provider 120 who is also running the mobile client application 111 on the provider device 140. Upon approaching the employee (and thus the provider device 140), the context circuit 112 of the user mobile device 104 (as well as a context circuit of the provider device 140) may recognize that collaboration mode is necessary for the intended action and may trigger both the mobile client application 111 to switch into collaboration mode and pair the user mobile device 104 with the provider device 140. The collaboration mode may then facilitate collaboration between the user 102 and the employee to perform a variety of tasks (e.g., withdrawal of large amounts, account maintenance) associated with the user's intended action.

Upon completion of the user's intended action, the mobile client application 111 on each of the user mobile device 104 and the provider device 140 may automatically exit the collaboration mode. Further, any requisite notifications and/or confirmations following the transaction may be automatically directed to both users via their respective devices. As the user 102 leaves the provider location, geofencing technology may similarly trigger the location circuit 113 of the user mobile device 104, causing the mobile client application 111 to automatically exit the contextual provider location mode and resume the normal mode of the mobile client application 111.

In another example embodiment of the method 200, the user 102, who has registered to use the mobile client application 111 and has granted permission to the provider 120 of the mobile client application 111 to use user information pertaining to the user 102, enters a provider location of the provider 120. Upon entering the provider location, geofencing technology is recognized by the location circuit 113 of the user mobile device 104, and the mobile client application 111 automatically switches into the contextual provider location mode.

The context circuit 112 of the user mobile device 104 then retrieves and analyzes user information pertaining to the user and identifies an uncommon event that may affect the user 102. The uncommon event may include a plurality of items, such as a news or weather event (e.g., an upcoming holiday, a storm), social media cues (e.g., the user 102 has expressed discontent with the provider 120 over social media), account cues (e.g., missed payments, overdraft fees), user cues (e.g., the user 102 has experienced a life event, the user 102 has had a negative interaction with the provider 120), and live sentiment analysis (e.g., obtained via emotional data). Upon identifying the uncommon event, the context circuit 112 may trigger the generation of a notification to be sent to an employee of the provider 120 provider location. Accordingly, upon being alerted to the uncommon event, the employee of the provider 120 may take an appropriate action (e.g., according to a policy of the provider 120) in an attempt to improve the experience for the user 102. Upon concluding their visit, the user 102 may leave the provider location, geofencing technology may similarly trigger the location circuit 113 of the user mobile device 104, and the mobile client application 111 may automatically exit the contextual provider location mode and resume the normal mode of the mobile client application 111.

In another example embodiment of the method 200, the user 102 is running a limited version of the mobile client application 111 and enters a provider location of the provider 120. In some arrangements, the user 102 running the limited version of the mobile client application 111 may be an individual delegated with temporary transaction authority, by an account holder of the provider 120. The limited version of the mobile client application 111 may allow for transient access to various products and services of the provider 120. Upon entering the premises of the provider location, geofencing technology recognized by the location circuit 113 of the user mobile device 104 causes the mobile client application 111 to automatically switch into the contextual provider location mode. The user 102 may then receive a notification via the mobile client application 111, indicating the scope of their delegated authority and a time limit for which it is granted. In some instances, the user 102 may be provided with a one-time passcode configured to be used to make a particular transaction. In some instances, the one-time passcode may be associated with a time, such that the user 102 may only use the one-time passcode within a predetermined window of time.

The user 102 may then be allowed to complete the tasks for which they have delegated authority (e.g., pair with an ATM or any other interactive electronic at the provider 120, account maintenance) using the mobile client application 111. The aforementioned account holder who delegated authority to the user 102 may additionally receive notifications regarding the performance of the delegated tasks (e.g., via a device associated with the account holder that is also running the mobile client application 111). Upon exiting the provider location, or upon expiration of the delegated authority time limit, the mobile client application 111 of the user mobile device 104 of the user 102 is configured to automatically revert back to the normal mode and prevent the user 102 from conducting any further actions on behalf of the account holder.

Similarly, in some instances, a company or corporation may register various devices with the provider computing system 122 for use with the mobile client application 111. In these instances, the mobile client application 111 on each of the various devices may be configured to operate in a corporate mode. Within the corporate mode, a user assigned by the company or corporation may be automatically given various permissions to perform various tasks and/or actions on behalf of the company.

Additionally, in some instances, in any of the aforementioned modes, the context circuit 112 of the user mobile device 104 running the mobile client application 111 may be configured to continuously analyze various behavioral data and other information pertaining to the user 102 to confirm that the user 102 associated with the user mobile device 104 is, in fact, the user that is operating the user mobile device 104. For example, the context circuit 112 may be configured to analyze various behavioral data and user information, such as, for example, user typing speed, user text phrasing, user gait, user voice, user facial recognition, and/or a variety of other behavioral indicators and/or user information to determine that the user 102 associated with the user mobile device 104 is, in fact, the user that is operating the user mobile device 104. Accordingly, upon detecting that another user (i.e., not the user 102 associated with the user mobile device 104), the mobile client application 111 may be configured to deactivate the user mobile device 104, restrict operation of the mobile client application 111, provide a notification to other devices associated with the user 102 to inform them that someone else is using the user mobile device 104, and/or take any other appropriate action.

Figure 3:
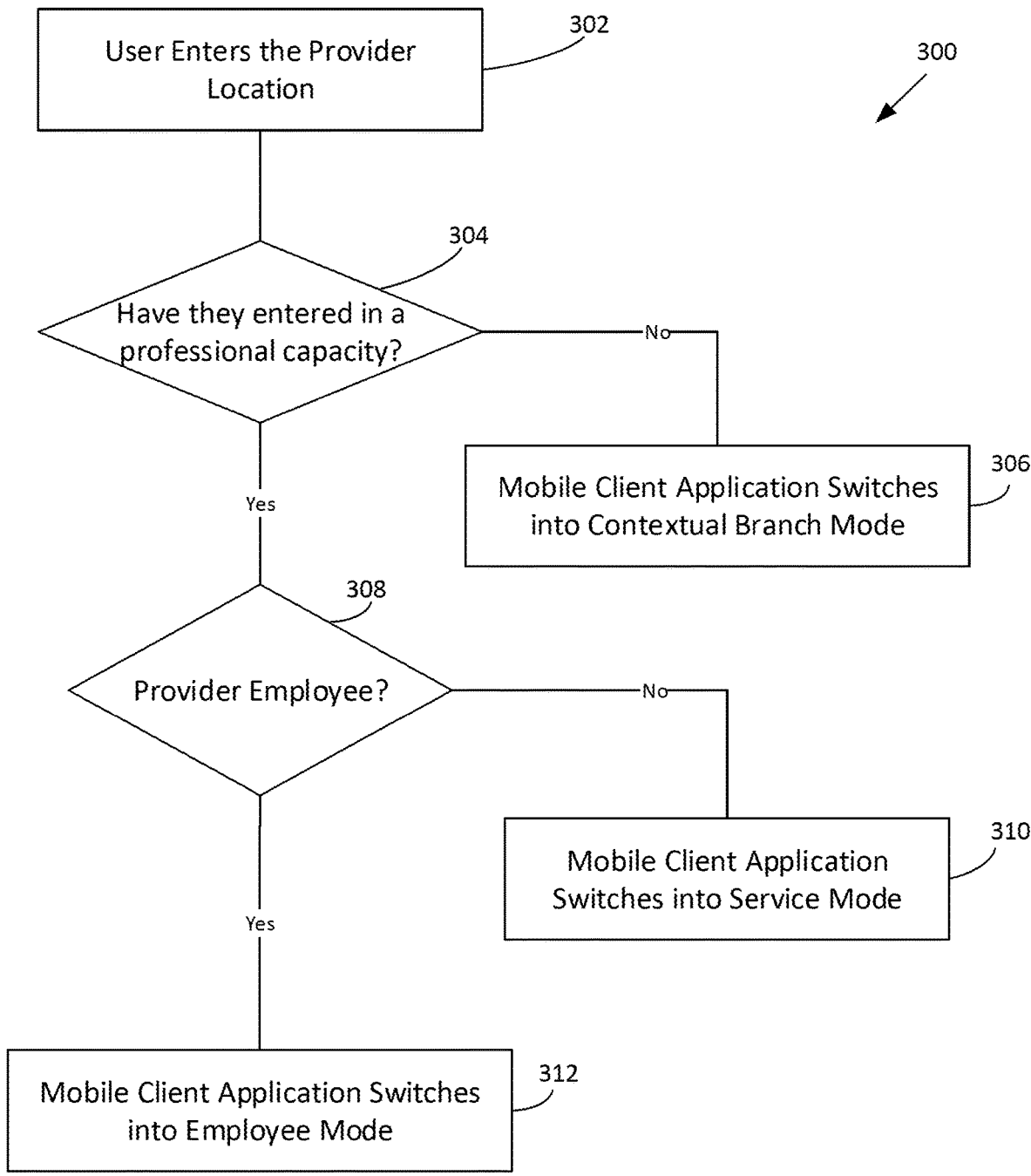
FIG. 3 is a flow diagram of a method for using the mobile client application by an employee or a service person, according to an example embodiment.

Referring to FIG. 3, a flow diagram for a method 300 for using the mobile client application 111 by an employee of the provider 120 or a service person associated with the provider 120 is shown according to an example embodiment. The method begins when the user 102 (e.g., the employee or the service person) enters the provider location, at step 302. Upon entering the provider location, the location circuit 113 of the user mobile device 104 determines that the user 102 has entered the provider location, using any of the locational technologies described herein.

Upon determining that the user 102 has entered the provider location, at step 302, the mobile client application 111 determines whether the user 102 has entered the provider location in a professional capacity, at step 304. For example, in some instances, the user 102 may simultaneously be both a customer of the provider 120 and an employee or service person associated with the provider 120. As such, the user 102 may be entering the provider location in either a personal capacity (e.g., to perform a transaction or other service offered by the provider 120) or in a professional capacity (e.g., to begin a shift and/or a particular work-related action or service for the provider 120).

Accordingly, in some instances, the user information pertaining to the user 102 (e.g., stored in the user database 138 of the provider computing system 122) may include both personal user data (e.g., any of the various user information described herein) and the employer-related data. The employer-related data may pertain to the user 102 and their relationship with the provider 120. For example, among other things, the employer-related data may include a work title (e.g., a branch employee, a non-branch employee, a branch manager, a district manager), a set of work responsibilities, a set of work-related permissions associated with the user 102, a work schedule of the user 102, a work history, and/or any other relevant information pertaining to the user 102 and their relationship with the provider 120. As such, in some instances, the mobile client application 111 may determine whether the user 102 has entered the provider location in a professional capacity by comparing a time that the user 102 has entered the provider location with the work schedule of the user 102.

If the mobile client application 111 determines that the user 102 has not entered the provider location in a professional capacity (i.e., the user 102 has entered the provider location in a personal capacity), the mobile client application 111 is configured to switch into the contextual provider location mode, at step 306. This contextual provider location mode may be similar in form and function to the contextual provider location mode described above, in FIG. 2. However, the contextual provider location mode provided to the user 102 (e.g., the provider employee or the service person) may further include additional functionality. For example, the additional functionality may pertain to various employment perks offered by the provider 120 (e.g., special services and/or products, employee discount rates for services and products).

If the mobile client application 111 determines that the user 102 has entered the provider location in a professional capacity, the mobile client application 111 may then determine whether the user 102 is a provider employee, at step 308. If the mobile client application 111 determines that the user 102 is not a provider employee, at step 308 the mobile client application 111 may then determine that the user 102 is a service person associated with the provider (e.g., a person who has been contracted to perform a requested service at the provider location by the provider 120) and be configured to automatically switch into a service mode, at step 310. For example, the service mode may be similar in form and function to the contextual provider location mode described above, in FIG. 2. However, the service mode may be specifically tailored (e.g., include specific functionality and/or provide specific permissions to the user 102) to allow the user 102 to perform necessary tasks associated with the requested service within or near the provider location.

If the mobile client application 111 determines that the user 102 is a provider employee, at step 308, the mobile client application 111 is configured to switch into an employee-specific contextual provider location mode or an "employee mode," at step 312. For example, the employee mode may be similar in form and function to the contextual provider location mode described above, in FIG. 2. However, the employee mode may provide employee-specific functionality that allows the employee to perform various work-related tasks associated with their role with the provider 120. For example, the employee mode may be configured to present various menus and options pertaining to work responsibilities of the user 102. In some instances, the various menus may include a list of daily required actions for the provider employee. In some instances, the employee mode may further be configured to provide a virtual time card for use by the user 102 to clock in and clock out of work. Additionally, in some instances, the provider device 140 may be configured to monitor various biometric and/or health data (e.g., heart rate, blood pressure, daily step count) associated with the provider employee. This information may be presented to the provider employee and may also be tracked by the provider 120 to be used in various health initiatives by encouraging healthy behavior. It should be appreciated that this type of health monitoring may also be available to the user 102 via the user mobile device 104.

The following description provides various example embodiments of the method 300. It will be appreciated that the following embodiments are provide as examples and are in no way meant to be limiting. It will further be appreciated that the method 300 may be adapted, as necessary, to conform to a variety of potential functionalities corresponding to a variety of service providers offering differing services.

In an example embodiment of the method 300, a service person who has registered for use of the mobile client application 111 on the service person's mobile device enters a provider location of a provider 120. Upon determining that the service person is on premises of the provider location in a professional capacity, the mobile client application 111 contacts the provider computing system 122 via a network interface circuit (e.g., similar to the network interface circuit 142 of the provider device 140) of the service person's mobile device in order to verify the service person's authority and work schedule. The service person is then authorized (e.g., authenticated and given various permissions) to begin their tasks at the provider location. For example, if the service person is authorized to provide a currency restock of an ATM, the mobile client application 111 may be configured to pair with an ATM and allow the service person to electronically open the ATM, based on the various permissions granted to the service person, to perform the currency restock.

In some instances, while performing their tasks, the service person may encounter various scenarios which require the assistance or oversight of a provider employee associated with the provider 120. In these instances, the mobile client application 111 may transmit a notification to one or more provider employees (e.g., via the mobile client application 111 on their respective provider devices 140) to request assistance. As the provider employee (or, in some instances, provider employees) approaches the service member, the context circuit 112 of the provider device 140 associated with the provider employee may trigger the pairing circuit 114 to automatically pair the provider device 140 with the service person's mobile device. Then, the mobile client application 111 on each of the provider device 140 and the service person's device may automatically switch into the collaboration mode. The collaboration mode may facilitate a plurality of interactions between the provider employee and the service person (e.g., utilizing cameras and sensors, pairing with interactive electronics, activating security features of the provider 120, monitoring the service person's tasks, recording events, sending notifications to management).

Once the various tasks to be performed by the service person have been completed, the mobile client application 111 on each of the provider device 140 and the service person's device may automatically switch back to the normal mode. When switching back to the normal mode, the mobile client application 111 may additionally automatically revoke any authorizations granted to the service person's application.

In another example embodiment of the method 300, an employee of the provider 120 is determined to be at a provider location of the provider 120, and the mobile client application 111 of the provider device 140 associated with the provider employee automatically triggers or switches into the employee mode. While using the mobile client application 111 in the employee mode, the provider employee may initiate a dual-custody task. A dual-custody task may be a task which requires a second party for oversight and/or consent. In some instances, the provider employee may initiate the dual-custody task by requesting to be paired with an appropriate second party. In other instances, the provider employee may initiate the dual-custody task by entering a location associated with a particular dual-custody task (e.g., a vault or lockbox area of the provider 120).

Upon initiating the dual-custody task, the mobile client application 111 on the provider device 140 associated with the employee and the mobile client application 111 on the provider device 140 associated with the second party (e.g., a second provider employee) may then switch into the collaboration mode, facilitating a plurality of interactions between the employee and the second party (e.g., utilizing cameras and sensors, pairing with interactive electronics, activating security features of the provider 120, monitoring the service person's tasks, recording events, sending notifications to management). In some arrangements, the collaboration mode between the applications may provide sufficient oversight to allow for a dual-custody task to be completed without the physical presence of the second party.

For example, the provider employee may perform a task in a vault of the provider 120 while the second party (e.g., a manager associated with the provider 120) is located elsewhere (e.g., in another location within the provider location or in a remote location). In some instances, the second party may also be a customer. For example, the customer may oversee and/or otherwise facilitate various customer-specific dual-custody tasks, such as accessing a safe deposit box of the customer. Once the appropriate tasks have been completed, the mobile client application 111 of the provider device 140 associated with the provider employee may return to the employee mode. Then, upon leaving the provider location (e.g., at the end of the provider employee's shift), the mobile client application 111 of the provider device 140 may automatically revert to normal mode.

In some instances, the mobile client application 111 may be configured to autonomously monitor the provider employee performing the dual-custody activity. That is, in addition to or in place of a second party being required for a particular dual-custody activity, the mobile client application 111 may be configured to monitor various aspects pertaining to the user 102 while performing the dual-custody activity to ensure that the provider employee is not doing anything incorrectly or performing any suspicious activity. For example, the mobile client application 111 may monitor the time it is taking the provider employee to complete a given task (e.g., performing a money count within a vault of the provider 120) and to compare the monitored time with an expected time. Similarly, the mobile client application 111 may be configured to monitor various physiological indicators (e.g., blood pressure, heart rate) to sense any unexpected changes that may indicate the user 102 is nervous or stressed, and thus may be performing a suspicious activity. Upon detecting that the user 102 is taking too long or an unexpected change in the user's physiological indicators, the mobile client application 111 may be configured to alert a second party. The second party may then be allowed to view and/or otherwise communicate with the provider employee (e.g., via the mobile client application 111) to assess the situation. Accordingly, in some instances, the mobile client application 111 may provide sufficient risk mitigation to allow for the user 102 to perform a dual-custody activity without direct supervision by another party.

Furthermore, in some instances, even when the provider employee is not performing a dual-custody activity, the provider device 140 associated with the provider employee may be selectively paired with a provider device 140 associated with a second party (e.g., a team member, a manger), and the mobile client application 111 of each provider device 140 may switch into collaboration mode to allow for the provider employee and the second party to selectively interact and transmit information back and forth. For example, if one team member wants to help another team member at a provider location, the two team members may selectively pair their devices and switch into collaboration mode to allow for the two team members to collaborate while performing a given task.

Figure 4:
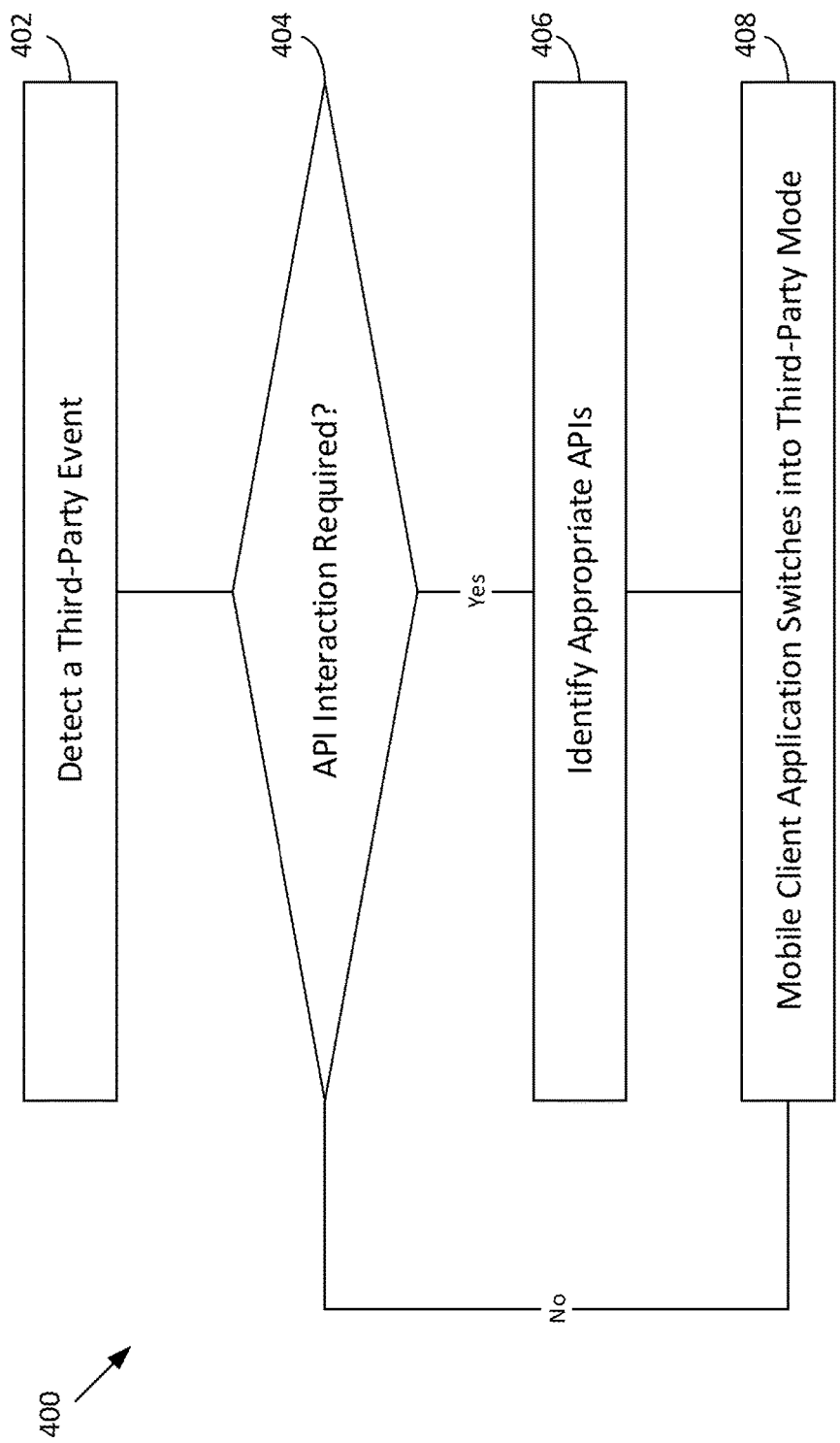
FIG. 4 is a flow diagram of a method for using the mobile client application to interact with a registered provider, according to an example embodiment.

Referring now to FIG. 4, a flow diagram for a method 400 for using the mobile client application 111 by the user 102 to access various functionalities associated with a registered service provider who has opted in or otherwise registered to interact with the mobile client application 111 is shown according to an example embodiment. The method 400 begins when the context circuit 112 of the mobile client application 111 detect a third-party event, at step 402. The third-party event may refer to any of a plurality of events associated with a user 102 interacting or otherwise interfacing with a third party.

Upon detecting the third-party event, the mobile client application 111 is configured to determine if the third-party event requires interaction with any application programming interfaces (APIs), belonging either to the associated third party (or in some instances the associated third parties) or the provider 120, at step 404. If the mobile client application 111 determines that an interaction with an API (or with multiple APIs) is required, the mobile client application 111 is configured to identify the appropriate APIs, at step 406. For example, appropriate APIs may be utilized to incorporate various information, designs, user interfaces, and/or functionalities within the mobile client application 111, as will be further described below.

Once the appropriate APIs have been identified, at step 406, or if the mobile client application 111 determines that there are no required APIs associated with the third-party event, the mobile client application 111 may be configured to automatically switch into a third-party mode associated with a third party. For example, as alluded to above, a variety of third parties (e.g., merchants, service providers, and/or any other business or establishments) may be registered to interact with users (e.g., the user 102) via the mobile client application 111. The third-party mode may be specifically tailored to the functionality and services provided by the third party. For example, in some instances, the third-party mode may provide a list of potential products, services, activities, and/or other selectable options provided or offered by the third party associated with the given third-party mode (e.g., provided via the appropriate API identified at step 406).

Accordingly, in some instances, the third party may design and/or develop a user interface to be incorporated into their associated third-party mode. The third party may then communicate the designed and/or developed user interface with the provider computing system 122 and/or the user mobile device 104 to be used to update the third-party mode, as appropriate. In other instances, upon registration to interact with users via the mobile client application 111, the provider computing system 122 may request various information (e.g., services, products, and/or activities to be provided by the third party, user interface design requests) from the third party pertaining to their desired user interface. In these instances, the provider computing system 122 may design and/or develop the user interface for the third-party mode associated with the third party.

Within the third-party mode, the mobile client application 111 may be configured to provide the user 102 (e.g., via the user mobile device 104) with various notifications and options for interacting with the third party. After the third-party event concludes (e.g., upon leaving a provider location associated with the third party, upon completion of an intended action by the user 102), the mobile client application 111 is configured to revert back to the normal mode.

The following description provides various example embodiments of the method 400. It will be appreciated that the following embodiments are provide as examples and are in no way meant to be limiting. It will further be appreciated that the method 400 may be adapted, as necessary, to conform to a variety of potential functionalities corresponding to a variety of service providers offering differing services.

In an example embodiment of the method 400, the mobile client application 111 of a user identifies that the user is an employee of a provider (e.g., the provider 120 or another provider registered for interaction with the mobile client application 111) on a business trip, currently in need of a ride share service (e.g., Uber, Lyft). In some arrangements, this identification may be the result of the context circuit 112 processing user information associated with the user 102, such as, for example, the user's calendar, the user's current location, the user's required location for meetings, etc. The mobile client application 111 may then connect directly with a ride share service API, facilitating the tasks required to utilize the ride share service. For example, this may include the mobile client application 111 automatically or the user selectively, using the mobile client application 111, ordering the ride, paying for the ride, providing the expense report to the provider computing system 122, etc. Upon arriving at the user's destination (e.g., upon completion of the user's intended interaction with the third party), the mobile client application 111 may automatically return to the normal mode.

In another example embodiment of the method 400, the third-party event may be a significant event (e.g., a local, national, or global event) that may affect or otherwise impact the user 102. In this case, the third party may be a weather and/or new source (or a plurality of weather and/or news sources) configured to provide information pertaining to the significant event to the user 102 via the mobile client application 111. Accordingly, the context circuit 112 of the user mobile device 104 may first detect that a significant event has occurred that may affect the user 102. The significant event may be detected via interaction with the various weather and/or news sources and may be any of a variety of events (e.g., natural disasters, transport strikes) that may impact or otherwise affect the user 102 and/or any potential actions of the user. In response to the detected significant event, the mobile client application 111 may be configured to automatically switch into a corresponding third-party mode configured to provide the user 102 with various information, updates, and/or options related to the significant event and/or how to access the resources offered by the provider 120 during the significant event. In some instances, the mobile client application 111 may remain in the third-party mode until the significant event has ended. In other instances, the user 102 may acknowledge the significant event within the third-party mode of the mobile client application 111 and request that the mobile client application 111 return to the normal mode. Once the significant event has ended, or upon receiving a request to return to the normal mode, the mobile client application 111 is configured to revert back to the normal mode.

For example, in response to detecting a severe storm, the mobile client application 111 may modify its appearance and operation to provide an alert to the user 102, as well as information on where and how to access the resources offer by the provider 120 during the storm. After alerting the user 102 and providing any requisite notifications and/or other information to the user 102, once the storm has passed or upon receipt of a request from the user 102, the mobile client application 111 may then return to the normal mode.

The above-described systems and methods describe a mobile client application that utilizes various user information associated with a user of the mobile client application to modify both its appearance and functionality in order to provide a tailored experience for the user. The described systems and methods address a need for a universal mobile client application capable of providing appropriate functionality to the user based on the context of the user, identifying actions that the user intends to complete, providing suggestions for improved methods of completing their intended actions, and facilitating the user to complete their intended actions.

The embodiments described herein have been described with reference to drawings. The drawings illustrate certain details of specific embodiments that implement the systems and methods described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

An example system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method comprising:
    obtaining, by a mobile client application of a user mobile device, context data associated with a user;
    predicting, by the mobile client application, an intended action of the user to be performed at a provider location based on the context data associated with the user; and
    switching, by the mobile client application, into a context-based application mode based on the intended action of the user.

2. The method of claim 1, further comprising providing, by the mobile client application, a suggestion to the user via the user mobile device, the suggestion being associated with the intended action.

3. The method of claim 1, wherein, upon completion of the intended action, the method further comprises:
    generating, by the mobile client application, user information based on an action performed by the user while completing the intended action; and
    transmitting, via a network interface of the user mobile device, the user information to a provider to be stored in a user database.

4. The method of claim 1, further comprising:
    determining that the user mobile device is physically located within or near the provider location using geofencing technology.

5. The method of claim 1, further comprising:
    obtaining, by the mobile client application, user information associated with the user, wherein the user information further comprises at least one of employer-related data, transactional data, behavioral data, locational data, social media data, weather data, and current event data.

6. The method of claim 1, wherein the context-based application mode comprises a minimal and restricted version of the mobile client application configured to allow the user to perform a delegated action on behalf of an account holder associated with a provider.

7. The method of claim 1, wherein switching into the context-based application mode further comprises pairing with an interactive electronic device associated with a provider, and the context-based application mode is configured to provide a user interface to the user mobile device that allows the user to control functionality of the interactive electronic device.

8. The method of claim 1, wherein the context-based application mode is a collaboration mode that facilitates collaboration between the user and an employee of a provider to perform the intended action.

9. The method of claim 1, wherein the context-based application mode is a collaboration mode that facilitates a dual-custody task to be completed by a provider employee that is monitored by the mobile client application.

10. The method of claim 1, further comprising:
    interfacing, by the mobile client application, to a third party service via an API; and
    automating, by the mobile client application, at least one of a third party payment.

11. A non-transitory computer-readable media having computer-executable instructions embodied therein that, when executed on a processor of a user mobile device, cause the user mobile device to perform operations, the operations comprising:
    obtain context data associated with a user;
        predict an intended action of the user to be performed at a provider location based on the context data associated with the user; and
    switch into a context-based application mode based on the intended action of the user.

12. The non-transitory computer-readable media of claim 11, the operations further comprising providing, by a mobile client application, a suggestion to the user via the user mobile device, the suggestion being associated with the intended action.

13. The non-transitory computer-readable media of claim 11, wherein, upon completion of the intended action, the operations further comprising:
    generating, by a mobile client application, user information based on an action performed by the user while completing the intended action; and
    transmitting, via a network interface of the user mobile device, the user information to a provider to be stored in a user database.

14. The non-transitory computer-readable media of claim 11, the operations further comprising:
    obtaining, by a mobile client application, user information associated with the user, wherein the user information further comprises at least one of employer-related data, transactional data, behavioral data, locational data, social media data, weather data, and current event data.

15. The non-transitory computer-readable media of claim 11, wherein the context-based application mode comprises a minimal and restricted version of a mobile client application configured to allow the user to perform a delegated action on behalf of an account holder associated with a provider.

16. The non-transitory computer-readable media of claim 11, wherein switching into the context-based application mode further comprises pairing with an interactive electronic device associated with a provider, and the context-based application mode is configured to provide a user interface to the user mobile device that allows the user to control functionality of the interactive electronic device.

17. The non-transitory computer-readable media of claim 11, wherein the context-based application mode is a collaboration mode that facilitates collaboration between the user and an employee of a provider to perform the intended action.

18. The non-transitory computer-readable media of claim 11, wherein the context-based application mode is a collaboration mode that facilitates a dual-custody task to be completed by a provider employee that is monitored by a mobile client application.

19. The non-transitory computer-readable media of claim 11, the operations further comprising:

interfacing, by a mobile client application, to a third party service via an API; and automating, by the mobile client application, at least one of a third party payment.

20. A system associated with a provider, the system comprising:

a provider computing system associated with the provider;

a user mobile device including a network interface circuit and a processing circuit, the network interface circuit being configured to communicate with the provider computing system over a network, the processing circuit including a processor and a memory, the memory containing instructions which when executed by the processor cause it to:

obtain context data associated with a user;

predict an intended action of the user to be performed at a provider location based on the context data associated with the user; and switch into a context-based application mode based on the intended action of the user.

* * * * *